(12) United States Patent
Cross

(10) Patent No.: US 9,374,952 B1
(45) Date of Patent: Jun. 28, 2016

(54) ROTATABLE VERTICAL GROWING SYSTEM

(71) Applicant: John Thomas Cross, Ashland, OR (US)

(72) Inventor: John Thomas Cross, Ashland, OR (US)

( * ) Notice: Subject to any disclaimer, the term of this patent is extended or adjusted under 35 U.S.C. 154(b) by 83 days.

(21) Appl. No.: 14/201,033

(22) Filed: Mar. 7, 2014

Related U.S. Application Data

(60) Provisional application No. 61/852,130, filed on Mar. 15, 2013.

(51) Int. Cl.
*A01G 31/02* (2006.01)
*A01G 31/04* (2006.01)

(52) U.S. Cl.
CPC .............. *A01G 31/02* (2013.01); *A01G 31/047* (2013.01)

(58) Field of Classification Search
CPC ... A01G 31/06; A01G 31/047; A01G 31/042; A01G 31/04; A01G 2031/006
USPC ............ 119/259–263; 47/58.1 R, 62 R, 59 R, 47/1.01 R, 67, 58.1 FV
See application file for complete search history.

(56) References Cited

U.S. PATENT DOCUMENTS

| | | | | |
|---|---|---|---|---|
| 4,175,354 A * | 11/1979 | Anderson | ............ | A01G 27/006 211/1.51 |
| 5,394,647 A * | 3/1995 | Blackford, Jr. | ........ | A01G 31/02 47/59 R |
| 5,724,768 A | 3/1998 | Ammann, Jr. | | |
| 7,559,173 B2 | 7/2009 | Brusatore | | |
| 8,516,743 B1 * | 8/2013 | Giacomantonio | ..... | A01G 9/022 47/62 A |
| 2003/0089037 A1 * | 5/2003 | Ware | ....................... | A01G 31/02 47/83 |
| 2006/0032128 A1 * | 2/2006 | Bryan, III | .............. | A01G 31/06 47/62 R |
| 2008/0016766 A1 * | 1/2008 | Sardo | ...................... | A23B 7/144 47/66.6 |
| 2009/0107410 A1 * | 4/2009 | Kania | ................... | A01K 63/006 119/246 |
| 2009/0265986 A1 * | 10/2009 | Young | .................... | A01G 31/02 47/62 R |
| 2012/0090236 A1 | 4/2012 | Orr | | |

* cited by examiner

*Primary Examiner* — Joshua Huson
(74) *Attorney, Agent, or Firm* — Jerry Haynes Law

(57) ABSTRACT

A rotatable vertical growing system enhances circulation between a hydroponic network and an aquaponic network in a closed fluid circulation. The networks are interdependent and operate on a constant body of growth fluid that continuously circulates between an aquaponic vessel and a hydroponic growing container. A rotational energy and a direct pressure generated by an external fluid serve to increase the flow rate of the growth fluid during circulation. A rotatable base portion floats concentrically in the aquaponic vessel. The base portion includes a gear system that enables rotation. Protruding members extend from the rotating base portion to agitate and guide the growth fluid through the circulatory path. The external fluid discharges into the vessel to aerate the fluid, increase the flow rate of the growth fluid, and actuate the gear system. The hydroponic growing container rotates to provide uniform access to light for the plants.

19 Claims, 11 Drawing Sheets

US 9,374,952 B1

ROTATABLE VERTICAL GROWING SYSTEM

CROSS-REFERENCE TO RELATED APPLICATIONS

This application claims the benefit of U.S. provisional application No. 61/852,130, filed Mar. 15, 2013 and entitled "ROTATING HYDROPONIC/AQUAPONIC GROWING SYSTEM", which provisional application is hereby incorporated by reference herein in its entirety.

FIELD OF THE INVENTION

The present invention relates generally to a rotatable vertical growing system. More so, the rotatable vertical growing system generates rotational energy and pressure to increase flow rate in a circulatory path and uniformly expose a hydroponic network to elements.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that aquaculture is the controlled cultivation of aquatic organisms such as fish, crabs, mussels, and aquatic plants. Aquaponics can combine aquaculture and hydroponics to create an interdependent network of benefit to both aquarium animals and plants.

Typically, hydroponics involves growing plants using a growth medium such as a mineral nutrient solutions, in water. Soil is not used as the growth medium with hydroponics. This enables vertical growth and other nontraditional means of harvesting plants. It is known that terrestrial plants may be grown with their roots in the mineral nutrient solution only or in an inert medium, such as perlite, gravel, or mineral wool, and the like.

Often, aquaponic farming combines conventional aquaculture, such as raising aquatic animals with hydroponics in a symbiotic environment. In normal aquaculture, excretions from the animals being raised can accumulate in the water, increasing toxicity. These excretions may include nitrogenous waste.

It is well known that a rotation is a circular movement of an object around a center point of rotation. A three-dimensional object rotates always around an imaginary line called a rotation axis. If the axis is within the body, and passes through its center of mass the body is said to rotate upon itself, or spin. Controlled rotation can work to uniformly expose an object to light, or agitate a fluid, as the angular momentum of the rotation is increased or varied.

The growth of the plants are often stymied by a lack of even exposure to light. Otherwise, rotatably exposing the plants consumes large amounts of energy, especially in large scale farming. The toxic excretion of the aquarium animals tends to deposit due to insufficient flow during circulation. Oxygen, which is needed by both the plants and the aquarium animals may also be in short supply if the network is too stagnant.

Even though the above cited vertical growing systems address some of the needs of the market, however, a rotatable vertical growing system that generates rotational energy and pressure to increase flow rate in a circulatory path and uniformly expose a hydroponic network to elements is still needed.

SUMMARY OF THE INVENTION

From the foregoing discussion, it should be apparent that a need exists for a rotatable vertical growing system that generates rotational energy and pressure to increase flow rate through a growth fluid in a circulatory path and uniformly expose plants in a hydroponic network to light. In some embodiments, the system forms a rolling, aerated current though the growth fluid that flows between a hydroponic growing network and an aquaponic growing network within a closed circulation flow.

The rotatable vertical growing system utilizes rotational energy and external fluid pressure to agitate and aerate the growth fluid for creating a rapid current through increased flow rates. The rotational energy and fluid pressure serve to force the growth fluid to flow at a faster rate between the hydroponic network and the aquaponic network. This enhanced circulation flow enables the growth fluid to more efficiently carry nutrients and elements from at least one aquatic animal in the aquaponic network to at least one plant in the hydroponic network. Additionally, the enhanced circulation flow enhances filtration of the growth fluid flowing through the at least one plant before circulating back to the at least one aquatic animal. The system further utilizes rotational energy to uniformly expose plants in the hydroponic network to light.

In some embodiments, the rotatable vertical growing system may combine a hydroponic network with an aquaponic network in a closed fluid circulation. The hydroponic network and the aquaponic network are interdependent and operate on a constant body of growth fluid which is continuously circulated from an aquaponic vessel to at least one hydroponic growing container, and back to the aquaponic vessel. A rotational energy and a direct pressure generated by an external fluid serve to increase the flow rate of the growth fluid within the closed fluid circulation. The agitated growth fluid consequently forms air bubbles that produce a rolling current in the aquaponic vessel. The rolling current—a consequence of the faster flow rate—agitates and aerates the growth fluid with oxygen to invigorate both aquarium animals and plants.

One example of the beneficiary circulatory effects of the present invention involves the aquatic animal in the aquaponic vessel producing nitrogenous wastes. These toxic wastes are quickly and efficiently carried by the growth fluid to the hydroponic growing container to provide a constant source of nutrients for at least one plant. After passing over the at least one plant and at least one filter, the growth fluid may recirculate back into the aquaponic vessel in purified form to benefit the aquatic animal. The rotational energy and pressure generated by the present invention enable the entire circulation of the growth fluid to flow more efficiently and at a faster rate between the networks.

In some embodiments, a rotatable base portion generates the rotational energy used to agitate and aerate the growth fluid. The base portion may include a generally circular base configured to form a stable axis of rotation in a generally concentric area of an aquaponic vessel. The base portion can float within the aquaponic vessel, at least partially submerged in the growth fluid. The base portion may rotate through the use of any number of propelling mechanisms. One embodiment used to actuate rotation of the base portion, includes an external fluid that is forcibly discharged into the aquaponic vessel. The external fluid may include pressurized air generated by an external compressor.

A fluid line carries the external fluid into an internal section of the base portion, and in engagement with a gear system. The external fluid engages the gear system of the base portion. The pressure on the gear system is sufficiently gauged to actuate the gear system for operative rotation of the base portion. The base portion may include at least one protruding member that extends out from the base portion, and into the growth fluid. The at least one protruding member extends in a generally perpendicular orientation from the base portion, and rotatably engages the growth fluid in the aquaponic vessel for generating a rolling current thereto. Additionally, the at least one protruding member may be configured to guide the growth fluid towards at least one hydroponic growing container.

In some embodiments, the external fluid creates a direct pressure into the growth fluid. The pressure combines with the rotational energy to increase the flow rate of the growth fluid, aerate the growth fluid, and actuate the gear system for additional rotational energy. The direct pressure involves the external fluid flowing into the aquaponic vessel at a high velocity. Upon discharge into the aquaponic vessel through a fluid line, the external fluid creates a current through the growth fluid. The current is guided to flow into a vessel inlet through the at least one protruding member. This fast moving current joins with the current generated through the rotational energy of the base portion to maximize the flow rate. The combinative effects of the rotational energy and pressure help minimize energy consumption for agitation of the growth fluid. Additionally, the direct contact between the external fluid, which may include air, enhances aeration in the growth fluid. In any case, the rotational energy generated by the base portion and the direct pressure generated by the external fluid serve to increase the flow rate of the growth fluid from the aquaponic vessel to the at least one hydroponic growing container.

A first aspect of the present invention provides a rotatable vertical growing system for generating rotational energy and pressure in a growth fluid, comprising:

an aquaponic vessel configured to contain a growth fluid and at least one aquatic animal;

at least one hydroponic growing container configured to contain at least one plant, wherein the growth fluid is configured to circulate between the aquaponic vessel and the at least one hydroponic growing container;

a base portion disposed to position in a generally concentric area of the aquaponic vessel, the base portion configured to rotatably engage the growth fluid, the rotation of the base portion configured to generate a rotational energy, the rotational energy configured to at least partially increase a flow rate of the growth fluid, the rotational energy further configured to at least partially aerate the growth fluid, the base portion further configured to join with the at least one hydroponic growing container, the rotation of the base portion further configured to selectively expose the at least one plant to light; and an external fluid configured to discharge into the aquaponic vessel, the discharge configured to generate a pressure in the growth fluid, the pressure configured to at least partially increase the flow rate of the growth fluid, the pressure further configured to at least partially aerate the growth fluid, the pressure further configured to actuate rotation of the base portion.

In a second aspect, the aquaponic vessel comprises a fish tank, or a raceway tank, or a mixed-cell raceway tank, or a filter tank.

In another aspect the at least one aquatic animal comprises a school of fish.

In another aspect, the at least one hydroponic growing container may comprise of eight pipe sections fabricated from of polyethylene pipe or polyvinyl chloride, the at least one hydroponic growing container further comprising at least one aperture configured to receive the plant and enable at least partial flow of the growth fluid through the at least one plant, the at least one hydroponic growing container further comprising a growth medium. In other embodiments, any number or shape may, however, be used for the at least one hydroponic growing container.

In another aspect, the growth fluid comprises a mineral nutrient solution and water.

In another aspect, the external fluid comprises pressurized air.

In another aspect, the circulation of the growth fluid is configured to carry a nitrogenous waste from the aquaponic vessel to the at least one hydroponic growing container.

In another aspect, a filter and the at least one plant are configured to at least partially filter the growth fluid circulating into the aquaponic vessel.

In another aspect, the aquaponic vessel comprises at least one vessel lid, the at least one vessel lid comprising at least one lid aperture configured to selectively enable the growth fluid to enter the aquaponic vessel.

In another aspect, a support portion is configured to connect the base portion to the at least one hydroponic growing container, the support portion comprising a substantially flexible tube configured to carry the growth fluid between the base portion and the at least one hydroponic growing container.

In another aspect, the base portion comprises a base support bracket configured to stabilize the base portion during rotation, the base support bracket comprising a base end configured to attach to the base portion, the base end comprising a ring shape, the base support bracket further comprising a vessel end configured to attach to an inner periphery of the vessel.

In another aspect, the base portion comprises a centering pin configured to at least partially pass through the base portion for stabilizing an axis of rotation for the base portion.

In another aspect, the base portion comprises a base exterior portion, the base exterior portion comprising at least one protruding member configured to at least partially agitate and guide the circulating growth fluid, the at least one protruding member comprising at least one fin.

In another aspect, the base portion comprises a base interior portion, the base interior portion comprising a spring assembly configured to minimize space between the base end and the base portion.

In another aspect, the base interior portion comprises a gear system configured to actuate rotation of the base portion, the base interior portion further comprising at least one buoyant member configured to enable the base portion to maintain buoyancy in the growth fluid, the at least one buoyant member comprising a buoyant member valve configured to regulate the buoyancy of the at least one buoyant member, the base interior portion further comprising an air distribution manifold configured to regulate flow of the external fluid to the gear system and the at least one buoyant member.

In another aspect, the base portion is configured to maintain buoyancy in the growth fluid, the buoyancy adjustable in conjunction to a weight of the at least one plant.

In another aspect, a fluid line is configured to carry the external fluid to the aquaponic vessel, the fluid line comprising a fluid line bracket configured to secure the fluid line to the aquaponic vessel, the fluid line further comprising a fluid line swivel configured to enable at least partial adjustment of the fluid line in relation to the aquaponic vessel, the fluid line swivel further configured to facilitate rotation of the base portion.

In another aspect, a central mast is configured to align along the axis of rotation, the central mast further being disposed to extend between the fluid line swivel and the base end of the support bracket.

In another aspect, the external fluid is disposed to flow from the aquaponic vessel to the base interior portion through a base inlet.

In another aspect, the external fluid generates the pressure in the base interior portion, the pressure in the base interior portion is configured to actuate the gear system.

One objective of the present invention is to minimize energy consumption by utilizing rotational energy and pressure from an external fluid to rotate the at least one hydroponic growing container and aerate the growth fluid in the aquaponic vessel.

Another objective is to agitate the growth fluid with the rotational energy for increasing the flow rate of the growth fluid.

Another objective is to rotatably expose each plant to an equal amount of light.

Another objective is to rotate the at least one hydroponic growing container with minimal equipment and energy to optimize space.

Another objective is to expedite the circulation of the nitrogenous waste and nutrients from the aquaponic vessel to the plants growing in the hydroponic growing container. The plants serve to at least partially filter the growth fluid from the nitrogenous waste and thereby, supply fresh growth fluid to the aquarium animal.

Yet another objective is to filter the growth fluid through at least one biofilter and/or the plant in the hydroponic growing container.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which:

FIG. 1A illustrates the rotatable vertical growing system having an overhead fluid line for discharging an external fluid, and FIG. 1B illustrates the rotatable vertical growing system having a pump and filter system for discharging and filtering the external fluid, in accordance with an embodiment of the present invention;

FIG. 7A illustrates a fish tank receiving an external fluid from a pump and generating rotational energy, FIG. 7B illustrates a large scale rotatable vertical growing system having a large hydroponic growing container and a walkway for observation of at least one aquatic animal, and FIG. 7C illustrates the large hydroponic growing container supported by one exemplary support portion and rotating over a fish tank, in accordance with an embodiment of the present invention.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1A:
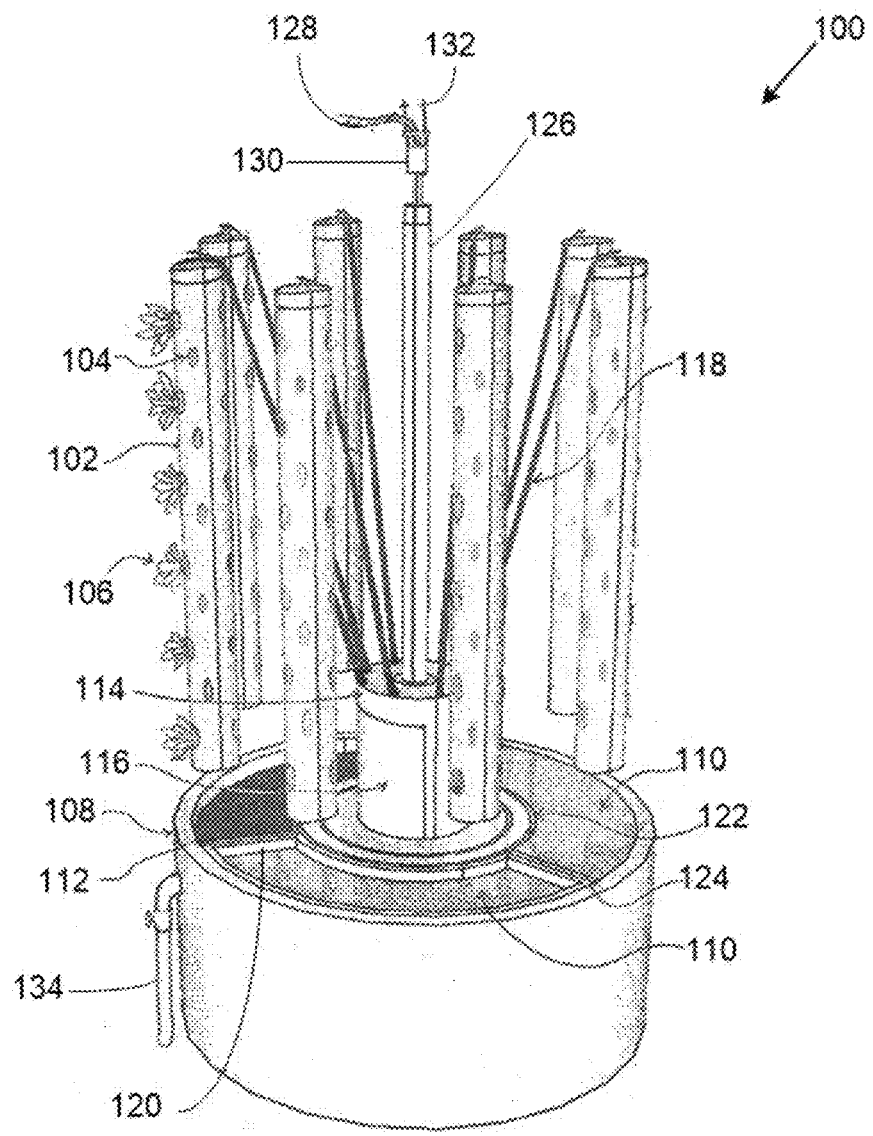
FIGS. 1A and 1B illustrate detailed perspective views of an exemplary rotatable vertical growing system, where
Figure 1B:
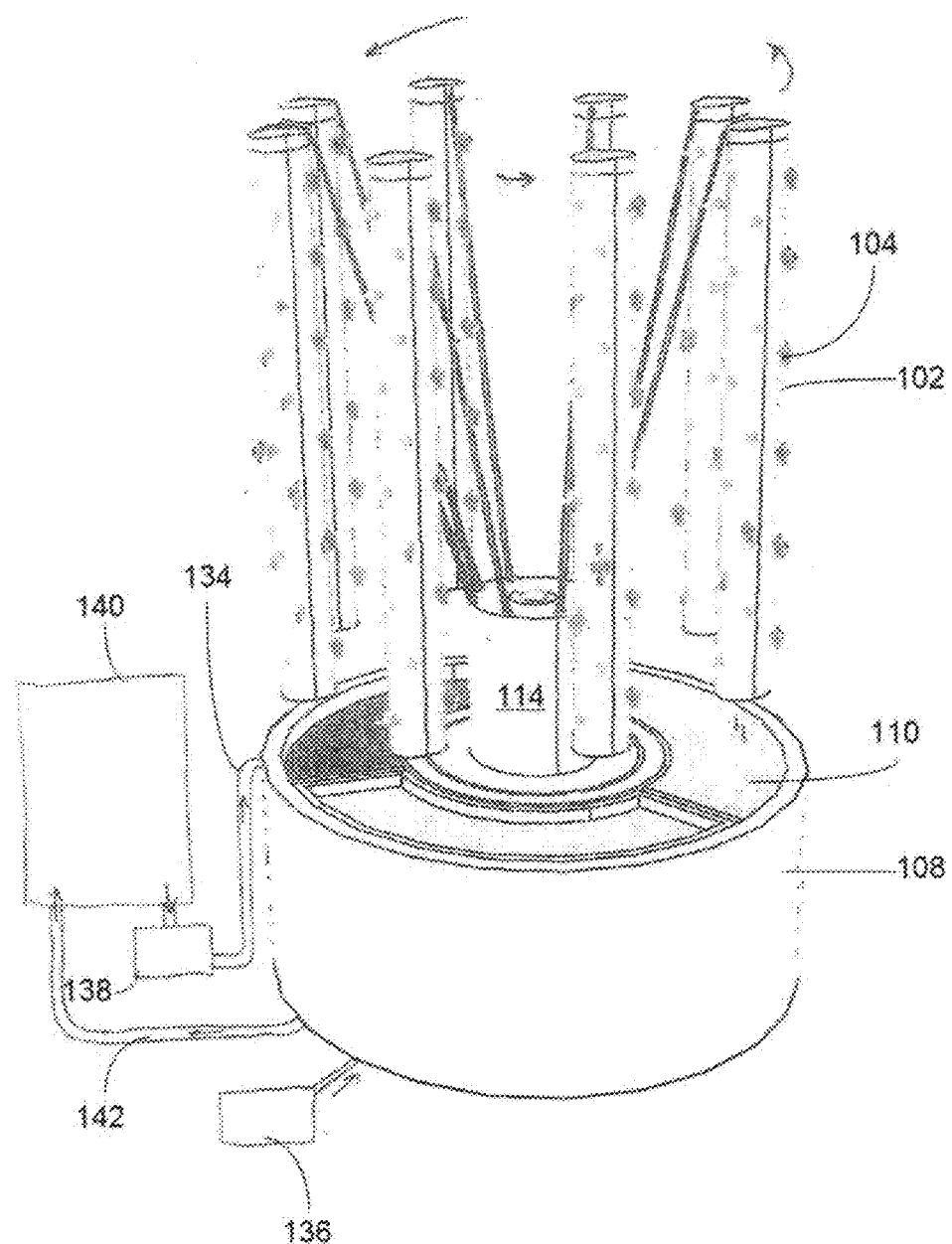

As shown in FIGS. 1A and 1B, a rotatable vertical growing system 100 is directed towards an interconnected network of hydroponics and aquaponics that generates a rolling, aerated current of growth fluid 220 throughout a circulatory path, and rotatably exposes the hydroponic network to uniform amounts of light. In one embodiment of the present invention, a rotatable vertical growing system 100 combines a hydroponic network with an aquaponic network in a closed fluid circulation. The hydroponic network and the aquaponic network are interdependent and operate on a constant body of the growth fluid 220, which is continuously circulated from an aquaponic vessel 108 to at least one hydroponic growing container 102, and back to the aquaponic vessel 108.

As referenced in FIG. 1A, the aquaponic vessel 108 is configured to contain a growth fluid 220 and at least one aquatic animal (not shown). The aquaponic vessel 108 may include, without limitation, a fish tank, a raceway tank, a mixed-cell raceway tank, and a filter tank. The growth fluid 220 may include a mineral nutrient solution and water formulated to support life in a hydroponic network. The at least one aquatic animal may include, without limitation, a variety of aquatic animals, such as fish, crawfish, snails, shrimp, frogs, and oysters.

In some embodiments, the aquaponic vessel 108 includes at least one vessel lid 110 configured to form a protective cover over the aquaponic vessel 108. Each vessel lid 110 can be detached from the aquaponic vessel 108 to regulate access to the growth fluid 220 and the at least one aquatic animal. Additionally, the at least one vessel lid 110 may help shield the at least one aquarium animal form external elements, such as sun, snow, rain, and debris. The at least one vessel lid 110 can also serve as an insulation. The vessel lid 110 includes at least one lid aperture 112 for enabling at least partial flow of the growth fluid 220 into the aquaponic vessel 108 during the circulation. In one embodiment, the vessel lid 110 is a netting. Any material conducive for protecting the at least one aquarium animal and the growth fluid 220 may, however, be utilized, including, without limitation, polyethylene, polyurethane, Plexiglas, fiberglass, a rigid polymer, metal, and wood.

The at least one hydroponic growing container 102 is configured to provide an environment conducive for containing and growing at least one plant 106 with known hydroponic methods. Those skilled in the art will recognize that the hydroponic growing container 102 is efficacious for growing a plant 106 using a growth medium, such as mineral nutrient solutions, in water, without soil. In one embodiments, the hydroponic growing container 102 may grow terrestrial plants having roots in the mineral nutrient solution only, or in growth medium, such as perlite, gravel, biochar, mineral wool, expanded clay pebbles, or coconut husk. In one embodiment, the at least one hydroponic growing container 102 comprises eight individual sections of polyethylene pipe. Each hydroponic growing container 102 includes at least one aperture 104 configured to receive the plant 106 and enable at least partial flow of the growth fluid 220 through the at least one plant 106. In this manner, the growth fluid 220 is configured to circulate between the aquaponic vessel 108 and the at least one hydroponic growing container 102.

In some embodiments, a base portion 114 is disposed to position in a generally concentric area of the aquaponic vessel 108. The base portion 114 may be configured to float in the growth fluid 220, adjustably raising or lowering in relation to the weight and growth of the at least one plant 106, and the level of the growth fluid 220 in the aquaponic vessel 108. The base portion 114 may include a generally circular housing that includes the chief operational functions of the system 100.

In some embodiments, the base portion 114 is configured to rotatably engage the growth fluid 220. The rotation of the base portion 114 generates a rotational energy throughout the circulatory path of the system 100 that is conducive to at least partially increasing the flow rate, at least partially aerating the growth fluid 220, and uniformly exposing the at least one plant 106 to light. The rotational energy generated by the base portion 114 can be adjusted through various means, such as increasing and reducing the actuating means thereto.

The base portion 114 is configured to join with the at least one hydroponic growing container 102. A support portion 118 connects the base portion 114 to the at least one hydroponic growing container 102. In this manner, the rotation of the base portion transfers into rotation of the at least one hydroponic growing container 102, and consequently the attached plant 106. The support portion 118 comprises a substantially flexible tube configured to carry the growth fluid 220 between the base portion 114 and the at least one hydroponic growing container 102. The generally upward slope of the support portion 118 requires sufficient pressure to force the growth fluid 220 through the circulatory path. In some embodiments, the rotation of the base portion 114 selectively exposes the at least one plant 106 to elements including, without limitation, light, rain, and visual inspection. For example, without limitation, the rotation is synchronized with a timer to enable equal access to light by rotating each plant 106 in proximity to a light source.

In some embodiments, a fluid line 128 supplies an external fluid (not shown) to the aquaponic vessel 108 from an overhead position. The external fluid may include, without limitation, pressurized air, pressurized growth fluid, and water. In other embodiments, the fluid line 128 may, however, discharge the external fluid from below or the sides of the aquaponic vessel 108. The fluid line 128 may include a flexible tube having sufficient stretching capacity to contain a pressurized gas, such as air. The fluid line 128 is attached to the aquaponic vessel 108 with a fluid line bracket 130 configured to fasten the fluid line 128 to the aquaponic vessel 108 through any variety of fastening means known in the art. The fluid line 128 further includes a fluid line swivel 132 configured to enable at least partial adjustment of the fluid line 128 in relation to the aquaponic vessel 108. The discharge of the external fluid is configured to generate a pressure in the growth fluid 220. The pressure is sufficient to at least partially increase the flow rate of the growth fluid 220, agitate the growth fluid 220, and actuate rotation the base portion 114.

In some embodiments, a central mast 126 aligns with an axis of rotation followed by the base portion. The central mast 126 is configured to extend between the fluid line swivel 132 and the base end 122 of the support bracket 120. The central mast 126 rotates in conjunction with the base portion 114 to help form another stabilizing structure for the system 100.

FIG. 1B shows a different embodiment for discharge of the external fluid. In this embodiment, an air pump 136 discharges the external fluid directly into the base inlet 134 from the side of the aquaponic vessel 108. The generated pressure, though, still actuates the base portion 114 for rotation. Additionally, the circulation passes through a filtering system 140 such as, charcoal, plants, or mesh. A water pump 138 serves to pump from the filtering system 140 back to the aquaponic vessel 108 through an outlet pipe 142. The pumping creates sufficient pressure to generate rotation in the base portion 114.

Figure 2:
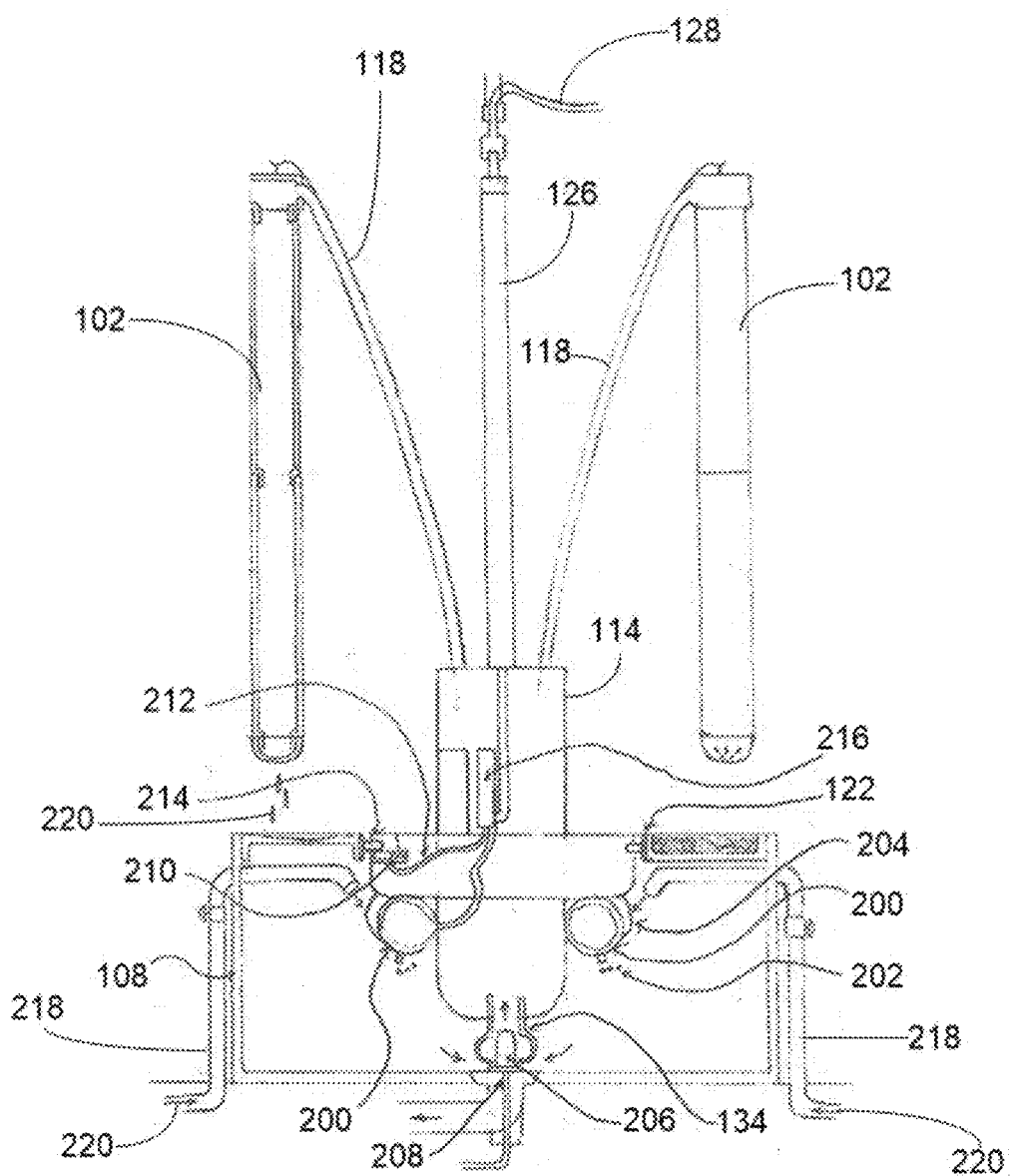
FIG. 2 illustrates a sectioned view of the rotatable vertical growing system with an exemplary fluid line connection, in accordance with an embodiment of the present invention.

FIG. 2 shows a base support bracket 120 configured to stabilize the base portion 114 during rotation. Through rigid supportive features, the base support bracket 120 helps stabilize an axis of rotation for the base portion 114. Those skilled in the art will recognize that rotation of a floating device, such as the base portion 114 requires external components to help stabilize the rotating device and maintain a uniform axis of rotation. The base support bracket 120 is defined by a base end 122 and a vessel end 124. The base end 122 is configured to adjustably attach to the base portion 114. The base end 122 may include a ring shape that conforms to the contour of the base portion 114, adjustably sliding along a longitudinal axis of the base portion 114 to compensate for buoyancy levels of base portion 114 in the growth fluid 220. The vessel end 124 is configured to attach to an inner periphery of the vessel 108, adjustably sliding along a longitudinal axis on the inside the aquaponic vessel 108. The vessel end is also arranged to compensate for buoyancy levels of base portion 114 in the growth fluid 220.

The base portion 114 further comprises a centering pin 206 configured to at least partially pass through a base inlet 134 in the base portion 114. The centering pin 206 helps to stabilize the axis of rotation and maintain a generally concentric position for the base portion 114 in the aquaponic vessel 108. A pipe drain 208 provides a discharge point for capturing excess growth fluid 220 from the aquaponic vessel 108. Both the base support bracket 120 and the centering pin 206 work in conjunction to provide a stable rotation by the base portion 114. In some embodiments, the base portion 114 is configured to maintain buoyancy in the growth fluid 220. The centering pin 206 remains loose in the base inlet 134 to enable movement as the buoyancy of the base portion 114 fluctuates in response to the weight of the at least one plant 106.

In some embodiments, the base portion 114 includes a base exterior portion, which forms the outer, visible surface of the base portion 114. The base exterior portion includes at least one protruding member 204 configured to at least partially agitate and guide the circulating growth fluid 220 during circulation. The at least one protruding member 204 may include, without limitation, a substantially perpendicularly extending fin that maximizes contact with the growth fluid 220. The fin may be oriented at a slight angle to direct the growth fluid 220 in direction of the desired circulatory path. The base exterior portion further comprises an access port 116 for regulating access to a base interior portion.

Figure 3:
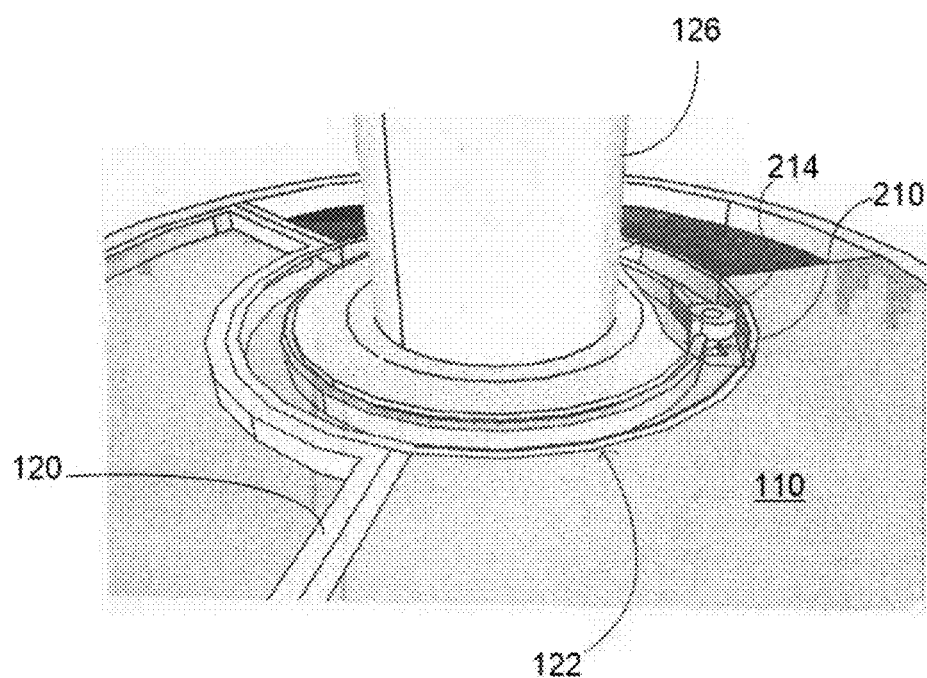
FIG. 3 illustrates a close-up perspective view of an upper end of an exemplary base portion with an exemplary gear system, in accordance with an embodiment of the present invention.

The base interior portion fills with the growth fluid 220 through a base inlet 134. The external fluid forces the growth fluid 220 into the base interior portion. The base interior portion includes a gear system 214 configured to actuate rotation of the base portion 114. FIG. 3 illustrates a close-up view of the gear system 214 engaging the base end 122. The gear system 214 positions between the vessel lid 110 and the base end 122, utilizing frictional forces to rotate the base portion 114 accordingly. The pressure from the external fluid throughout the growth fluid 220 actuates the gear system 214 to rotate. In one embodiment, the gear system 214 can include wheels having teeth that are responsive to the pressure form the external fluid. The pressure actuates the gear system 214 to rotate the base portion 114. Additionally, at least one auxiliary growth fluid inlet pipe 218 is configured to at least partially discharge a circulated portion of the growth fluid 220 into the aquaponic vessel 108. In this manner, the growth fluid 220 may be exchanged via a separate filtration route and then returned under pressure through the at least one auxiliary growth fluid inlet pipe 218.

The base interior portion further includes at least one buoyant member 200 configured to enable the base portion 114 to maintain buoyancy in the growth fluid 220. The at least one buoyant member 200 may include a pair of floats that position beneath the gear system 214 and help maintain buoyancy for the base portion 114. The external fluid can be used to fill the at least one buoyant member 200. The at least one buoyant member 200 includes a buoyant member valve 202 configured to regulate the buoyancy level of the at least one buoyant member 200 by releasing the external fluid as desired. The base interior portion further comprises an air distribution manifold 216 configured to regulate flow of the external fluid to the gear system 214 and the at least one buoyant member 200. The base interior portion includes a spring assembly 210 configured to minimize space between the base end 122 and the base portion 114. The spring assembly 210 helps reduce vibrations and undesirable movements during rotation of the base portion 114. At least one external fluid inlet tube 212 extends from the fluid line 128 and serves to inflate the at least one buoyant member 200; direct the external fluid towards the gear system 214; and generally direct the external fluid throughout the circulatory path.

Figure 4:
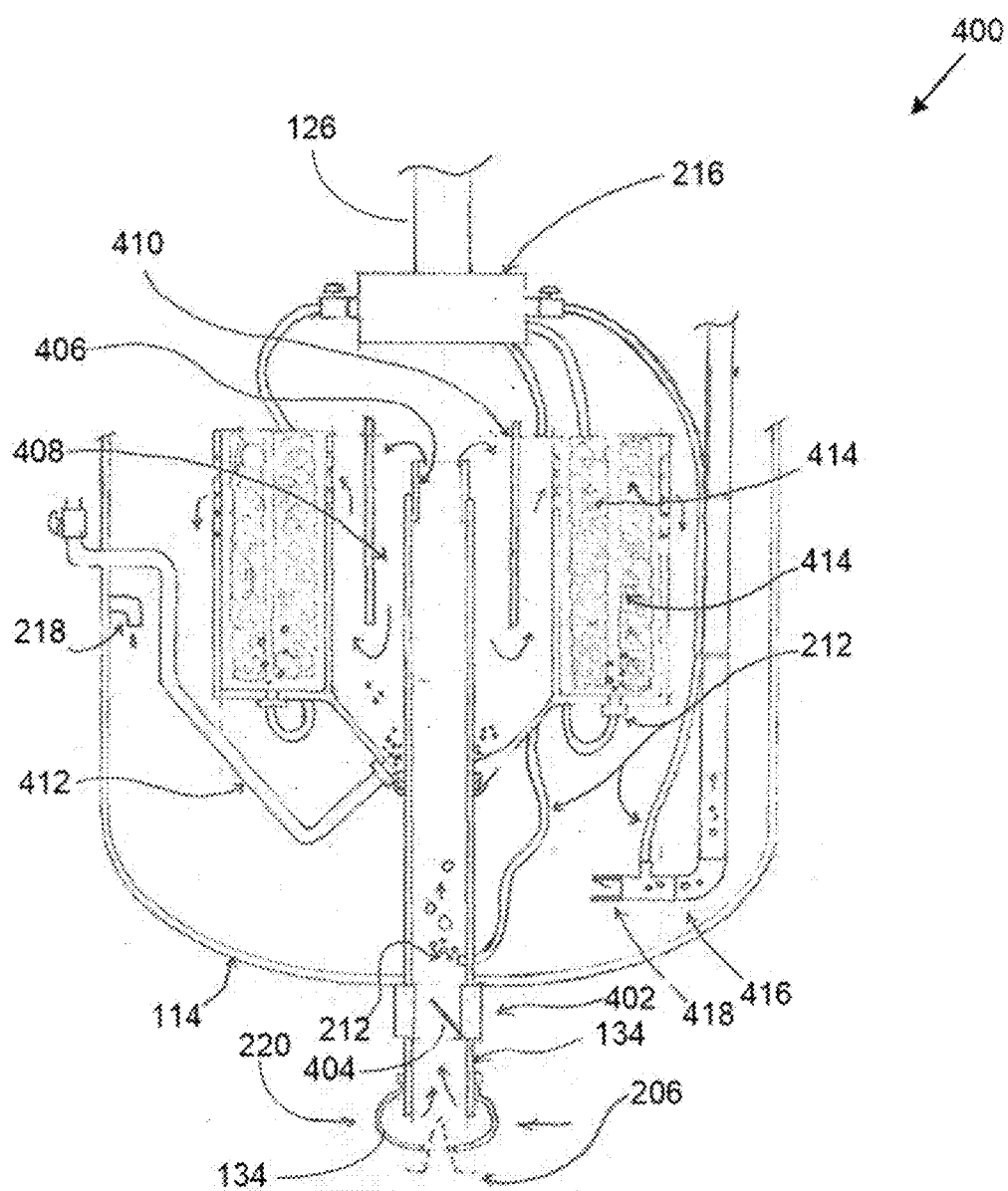
FIG. 4 illustrates a sectioned side view of a lower end of the base portion and an exemplary circulatory path of a growth fluid, in accordance with an embodiment of the present invention.

Turning now to FIG. 4, the system 100 operates in a closed fluid circulation 400. Within the closed fluid circulation 400, the hydroponic network and the aquaponic network are interdependent and operate on a constant body of the growth fluid 220, which is continuously circulated from the aquaponic vessel 108 to the at least one hydroponic growing container 102, and back to the aquaponic vessel 108. In some embodiments of the closed fluid circulation 400, the growth fluid 220 is forced from the aquaponic vessel 108 and into the base interior portion through the base inlet 134. Pressure generated with the external fluid increases the flow rate to enable the efficient and high pressure movement of the growth fluid 220. At a top end of the base inlet 134, an inlet screen 402 helps filter out the nitrogenous waste produced by the at least one aquatic animal. The inlet screen 402 forms the first of a plurality of filters utilized by the system 100. The filtration enhances the growth of the plant 106 and the aquarium animal. A check valve 404 helps regulate intake of the growth fluid 220.

In some embodiments, the growth fluid 220 may flow into the base interior portion, exiting out of an adjustable stand pipe 406. The adjustable stand pipe 406 may be raised and lowered to affect the flow of the growth fluid 220 into a clarifier section 408. The clarifier section 408 is fitted with at least one baffle 410. The at least one baffle 410 serves to separate solids from the growth fluid 220. The solids may include undesirable nitrogenous waste that is harmful to the fish or aquatic animal. The solids accumulate at a bottom end of the base interior portion and are discharged from the base portion 114 through an out pipe 412. After passing through the at least one baffle 410, the growth fluid 220 passes through at least one biofilter 414 for additional filtration. The biofilter 414 may include, without limitation, filter pads, filter media, and charcoal byproducts. From the at least one biofilter 414, the growth fluid 220 passes through the air distribution manifold 216 for distribution to the gear system 214 and the at least one buoyant member 200. A hydroponic intake 416 carries the growth fluid 220 to the at least one hydroponic growing container 102. A hydroponic check valve 418 helps regulate the flow of the growth fluid 220 before engagement with the at least one plant 106, for example creating a drip effect on the plant 106.

Figure 5:
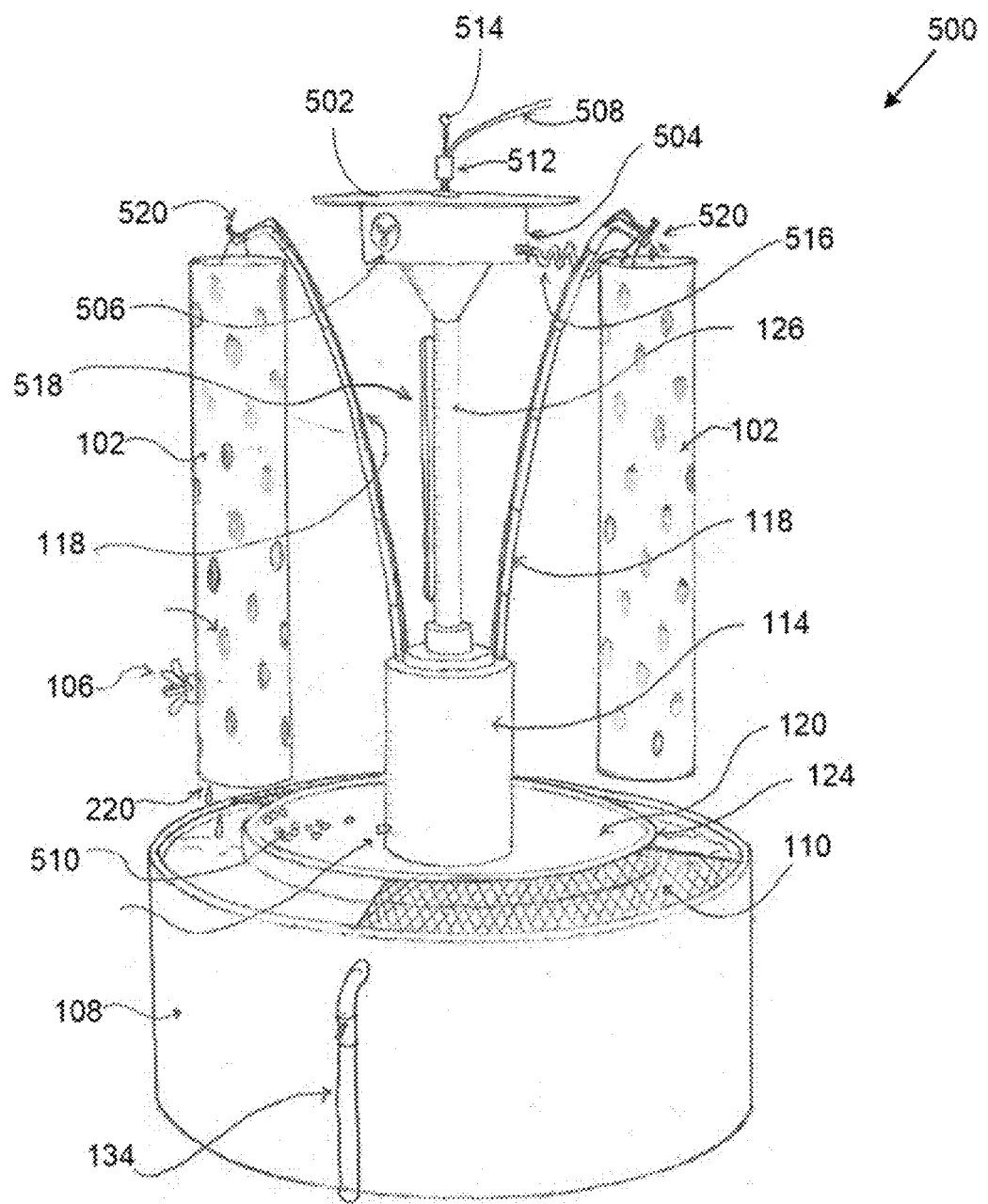
FIG. 5 illustrates a detailed perspective view of an exemplary electrical rotatable vertical growing system with an exemplary photovoltaic cell generating power, in accordance with an embodiment of the present invention.

FIG. 5 illustrates an electrical rotatable vertical growing system 500 with a photovoltaic cell 502 generating the power to actuate rotation of the base portion 114. The photovoltaic cell 502 may include any solar panel known in the art. Those skilled in the art will recognize that the utilization of solar energy is consistent with a chief objective of the present invention—minimizing nonrenewable energy consumption. Working in conjunction with the photovoltaic cell 502, an electrical portion 504 positions at the top end of the base portion 114 for distributing the generated electrical power to a motor in the gear system 214. A wire circuitry 508 regulates carries the electrical current. A slip ring 512 and an attachment clasp 514 help retain the electrical components to the central mast 126. Similar to the standard rotatable vertical growing system 100, a growth medium 510 helps filter the growth fluid 220 and retain nutrients for the plant 106.

In some embodiments, a pump (not shown) and a fan 506 help force the growth fluid 220 through the closed circulation flow 400 of the electrical rotatable vertical growing system 500. The pump further increases the flow rate in conjunction with the pressure and the rotary energy. A further novelty of this embodiment is a supplementary growth fluid supply line 516 that provides the growth fluid 220 directly to the at least one plant 106, by bypassing the circulatory path. Additionally, supplementary lighting 518 can be directed at the at least one plant 106. The supplementary lighting 518 attaches to the central mast 126 and illuminate from the power generated by the photovoltaic cell 502. A support fastener 520 may also be included to fasten the at least one hydroponic growing container 102 to the support portion 118. The support fastener 520 may include, without limitation, a hook, a clasp, a string, a magnet, and an adhesive.

Figure 6:
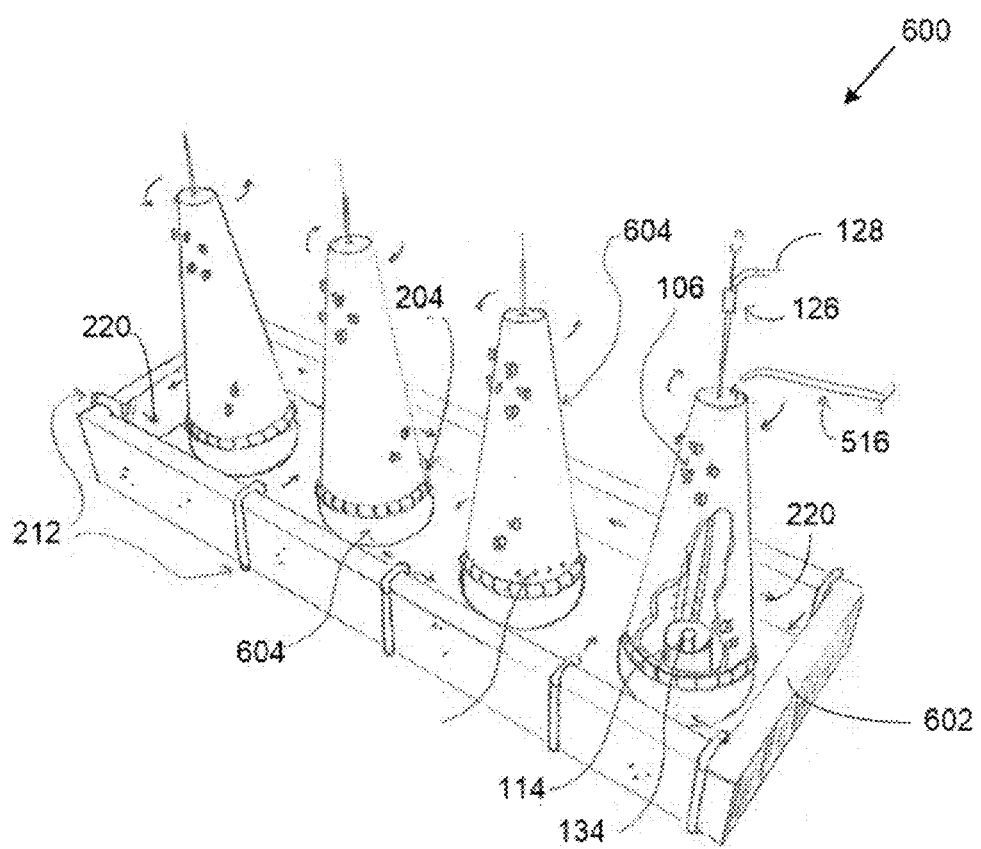
FIG. 6 illustrates a detailed perspective view of an exemplary mixed cell rotatable vertical growing system having a mixed cell raceway tank and a plurality of hydroponic growing containers, in accordance with an embodiment of the present invention.
Figure 7A:
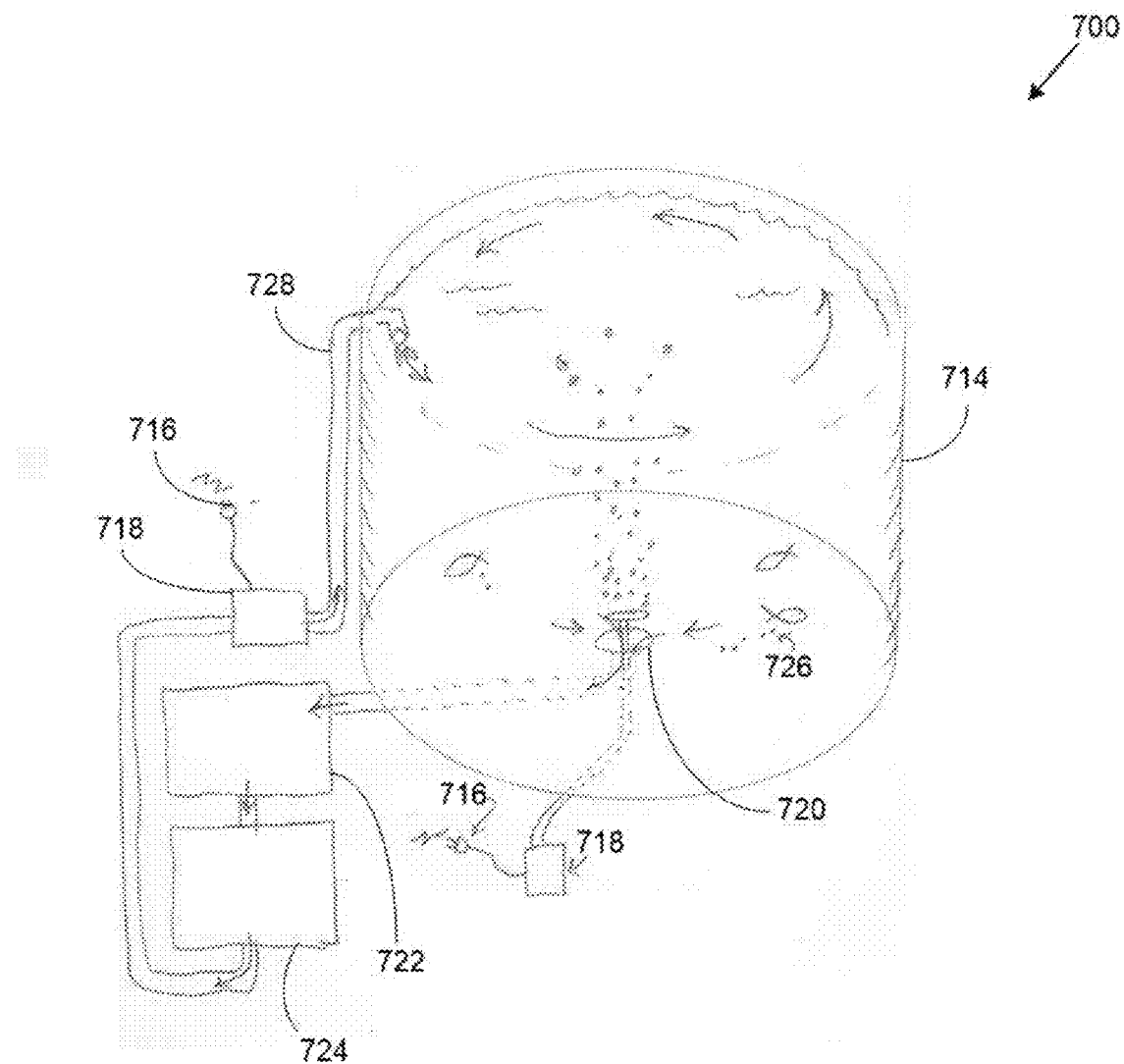
FIGS. 7A, 7B, and 7C illustrate detailed perspective view of a large scale rotatable vertical growing system having a large hydroponic growing container, where
Figure 7B:
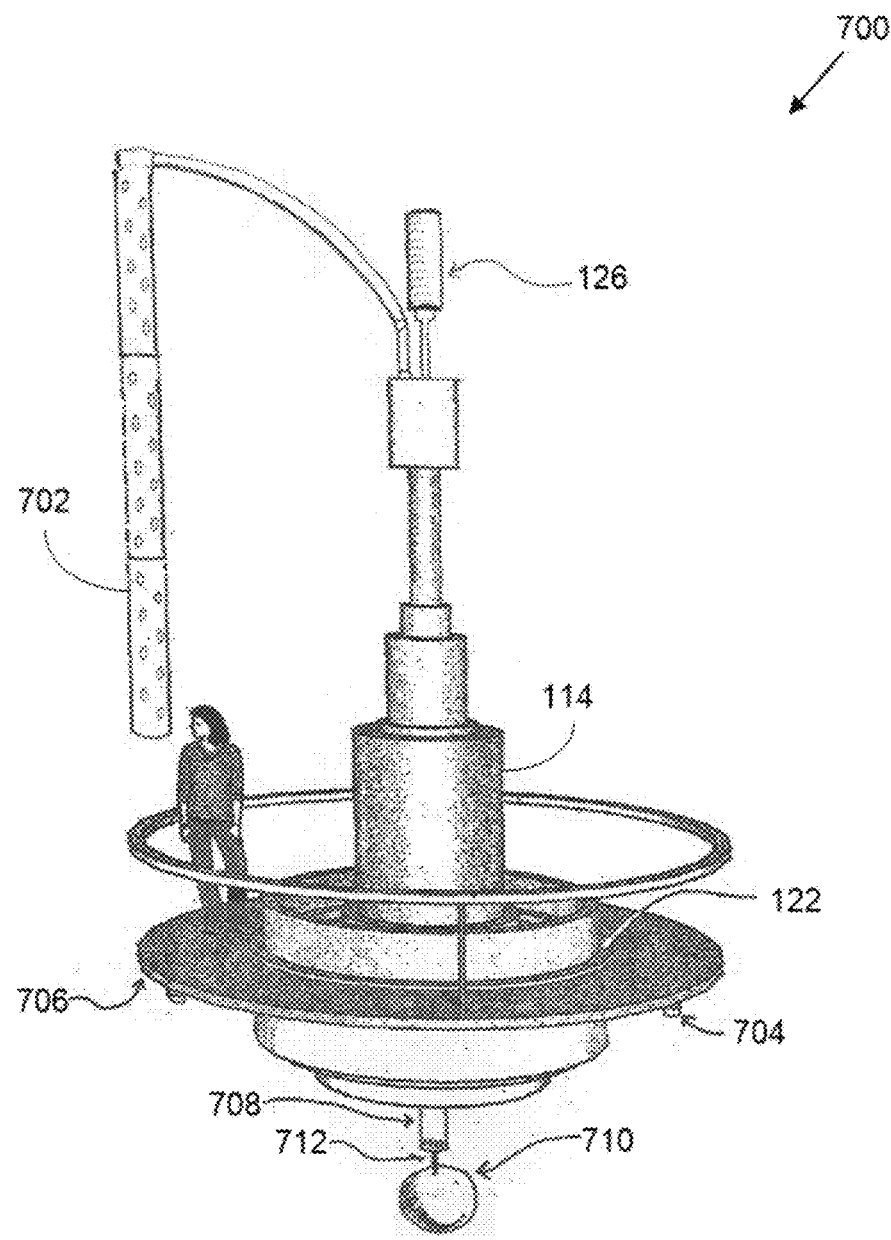
Figure 7C:
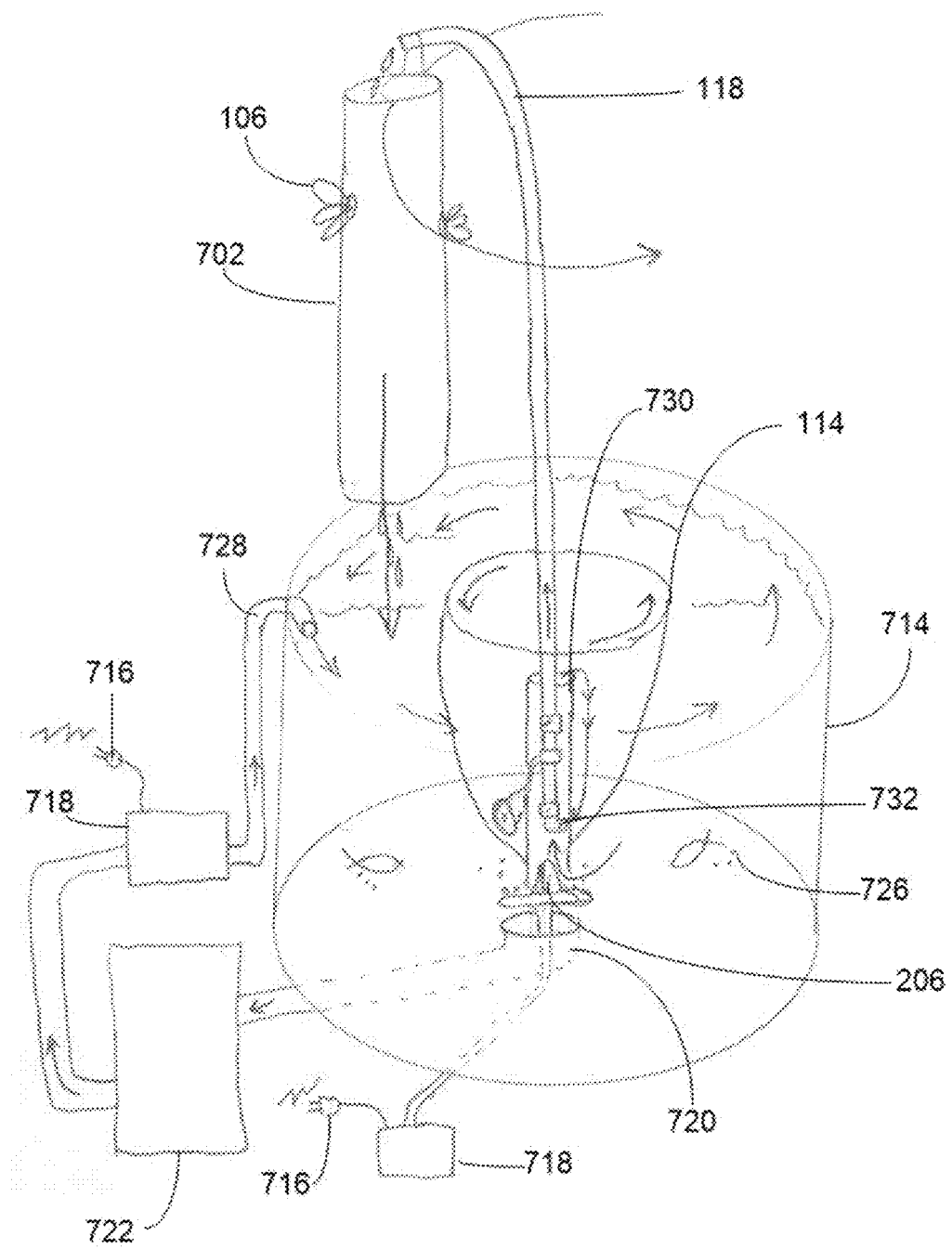

Turning now to FIG. 6, a mixed cell rotatable vertical growing system 600 utilizes a mixed-cell raceway tank 602. In one embodiments, the mixed-cell raceway tank 602 may include a plurality of hydroponic growing containers 604 operating in series. The mixed cell rotatable vertical growing system 600 operates substantially the same as the rotatable vertical growing system 100. At least one auxiliary growth fluid inlet pipe 218 is, however, configured to at least partially discharge a circulated portion of the growth fluid 220 into the mixed cell raceway tank. In this manner, the growth fluid 220 may be exchanged via a separate filtration route and then returned under pressure through the at least one auxiliary growth fluid inlet pipe 218. Additionally, a mixed cell pump (not shown) helps force the growth fluid 220 through the closed circulation flow 400 of the mixed cell rotatable vertical growing system 600. The mixed cell pump further increases the flow rate in conjunction with the pressure and the rotary energy.

a fish tank receiving an external fluid from a pump and generating rotational energy, FIG. 7B illustrates a large scale rotatable vertical growing system having a large hydroponic growing container and a walkway for observation of at least one aquatic animal, and FIG. 7C illustrates the large hydroponic growing container supported by one exemplary support portion and rotating over a fish tank FIG. 7A illustrates a large scale rotatable vertical growing system 700 having a large fish tank 714. The large scale rotatable vertical growing system 700 may be efficacious for raising fish commercially. Added benefits may include the at least one plant 106 that benefits from nutrients produced by the fish. In one embodiment, the large scale rotatable vertical growing system 700 is operable in a fish farm that comprises a fish tank 714 adapted for containing a body of water and a population of fish therein. The fish tank 714 may be formed of any suitable material and may be above or below ground. In one embodiment, the fish tank 714 is, however, formed in a body of concrete, the upper surface of which defines the floor of the fish tank 714. An observer may walk around a walkway 706 on the perimeter of the fish tank 714 for inspection and harvesting of the fish and the plants 106. A power source 716 powers a large pump 718 that helps circulate the growth fluid 220 with sufficient pressure to generate rotational energy in the fish tank 714. A large drain 720 sucks in excrement 726 from the fish, which helps clean the fish tank 714. Nutrients from the excrement 726, however are utilized on a large plant system 724. The excrement 726 is passed through a large filter 722 before finally benefiting the large plant system 724 in the form of growth fluid 220 through a return line 728.

Turning now to FIG. 7B, the large scale rotatable vertical growing system 700 includes a large hydroponic growing container 702 configured to contain and grow the at least one plant 106. At least one drive wheel 704 attach to the outer perimeter of the walkway 706 to engage a center ring affixed to the fish tank or other fixed structure. At least one motor 708 may be utilized to power pumps, air compressors, drive motors, and the like. Those skilled in the art will recognize that due to the large size of the large scale rotatable vertical growing system 700, angular momentum may destabilize the axis of rotation. Consequently, an anchor 710 attaches to an adjustable cable 712 on the bottom end of the large scale rotatable vertical growing system 700 for stabilization and maintenance in one position. The support portion 118 in this embodiment may include a plurality of arms that bend to support the greater weight of the large hydroponic growing container 704.

FIG. 7C illustrates the fish tank 714 working in conjunction with a large hydroponic growing container 702. In this embodiment, the large hydroponic growing container 702 is supported by the support portion 118 in the form of a single flexible arm. The base portion 114 connects to the support portion 118 to enable rotation. From within the base portion 114, a large pump 718 forces the external fluid into a main tube 730. The growth fluid is then forced out of the main tube 730 and recirculated back into a support portion inlet 732 to be carried to the large hydroponic growing container 702. A power source 716 powers a large pump 718 that helps circulate the growth fluid 220 with sufficient pressure to generate rotational energy in the fish tank 714. A large drain 720 sucks in excrement 726 from the fish, which helps clean the fish tank 714. Nutrients from the excrement 726, however are recycled back into the at least one plant 106 in the large hydroponic growing container 702.

Figure 8:
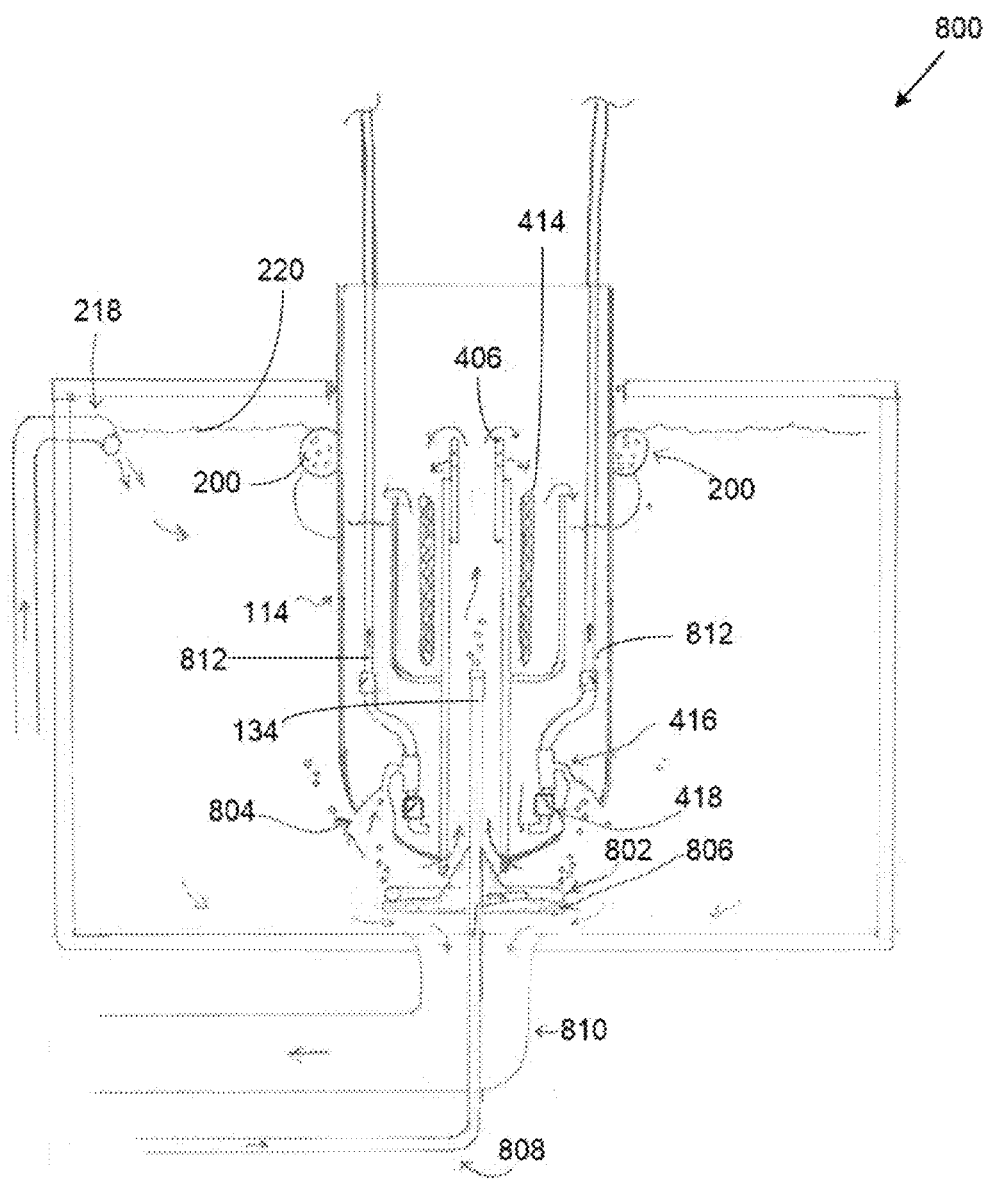
FIG. 8 illustrates a detailed perspective view of an exemplary lower end fluid line growing system having a lower fuel line that discharges an external fluid into a lower end of an aquaponic vessel, in accordance with an embodiment of the present invention.

FIG. 8 shows an additional embodiment, comprising a lower end fluid line 128 growing system 800. In this embodiment, a lower fluid line 808 supplies the external fluid to the aquaponic vessel 108 from a lower end, rather than overhead. The lower fluid line 808, similar to the fluid line 128, receives the external fluid form a compressor or other pressurized fluid source. The lower fluid line 808 joins with a bottom end of the aquaponic vessel 108 at a diffuser ring 802 that maintains a static position. The diffuser ring 802 helps diffuse and temper the pressure generated by the external fluid. The diffusion of the pressure creates air bubbles that aerate the growth fluid 220. The air bubbles form the diffuser ring 802 pass through the growth fluid 220 to at least one funnel opening 804 located on the side of the base portion 114. The at least one funnel opening 804 serves to funnel the air bubbles with the growth fluid 220 to the at least one hydroponic intake 416, and then through an air lift assembly 812. The aeration provided by the bubbles serve to enhance growth of the at least one plant 106.

In some embodiments, the diffuser ring 802 joins with a drain cap 806 that aligns with the centering pin 206 to help center the base portion 114. The drain cap 806 regulates the exit of excess growth fluid 220 from the base interior portion through a drain 810. When in a closed position, the drain cap 806 also enables the growth fluid 220 to continue flowing in the circulatory path. Similar to the rotatable vertical growing system 100, the lower growth fluid 220 intake provided by this embodiment still maintains the same basic functions, including external fluid actuating the gear system 214, at least one protruding member 204 agitating the growth fluid 220, and rotatable access to light by the at least one plant 106. In any case the lower positioning of the fluid line 128 may optimize space in some environments.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A rotatable vertical growing system for generating rotational flow, movement and pressure in a growth fluid, the rotatable vertical growing system comprising:
   an aquaponic vessel configured to contain a growth fluid and at least one aquatic animal;
   at least one hydroponic growing container configured to contain at least one plant,
   wherein the growth fluid is configured to circulate between the aquaponic vessel and the at least one hydroponic growing container;
   a base portion comprising a base support bracket disposed to position said base portion in a generally concentric area of the aquaponic vessel such that the base portion is rotatable about a vertical axis of rotation with respect to the aquaponic vessel and configured to rotatably engage the growth fluid, the rotation of the base portion configured to produce/generate rotational flow/movement of the growth fluid, such that the rotational flow/movement of the growth fluid by the base portion is configured to at least partially increase a flow rate of the growth fluid, and further configured to at least partially aerate the growth fluid,
   the base portion further configured to join with the at least one hydroponic growing container, the rotation of the base portion further configured to selectively expose the at least one plant to light; and
   an external fluid configured to discharge into the aquaponic vessel, the discharge configured to generate a pressure in the growth fluid, the pressure configured to at least partially increase the flow rate of the growth fluid, the pressure further configured to at least partially aerate the growth fluid, the pressure further configured to actuate rotation of the base portion.

2. The system of claim 1, in which the aquaponic vessel comprises a fish tank.

3. The system of claim 1, in which the at least one aquatic animal comprises a school of fish.

4. The system of claim 1, in which the at least one hydroponic growing container comprises at least one polyethylene or polyvinyl chloride pipe, the at least one hydroponic growing container further comprising at least one aperture configured to receive the plant and enable at least partial flow of the growth fluid through the at least one plant, the at least one hydroponic growing container further comprising a growth medium, the growth medium comprising perlite.

5. The system of claim 1, in which the growth fluid comprises a mineral nutrient solution and water, the circulation of the growth fluid configured to carry a nitrogenous waste from the aquaponic vessel to the at least one hydroponic growing container.

6. The system of claim 1, in which the external fluid comprises pressurized air.

7. The system of claim 1, further comprising a biofilter in fluid communication with said base portion, wherein the biofilter and the at least one plant are configured to at least partially filter the growth fluid circulating into the aquaponic vessel.

8. The system of claim 1, in which the aquaponic vessel comprises at least one vessel lid, the at least one vessel lid comprising at least one lid aperture configured to selectively enable the growth fluid to enter the aquaponic vessel.

9. The system of claim 1 further comprising a support portion, wherein the support portion is configured to connect the base portion to the at least one hydroponic growing container, the support portion comprising a substantially flexible tube configured to carry the growth fluid between the base portion and the at least one hydroponic growing container.

10. The system of claim 1, in which the base support bracket is configured to stabilize the base portion during rotation, the base support bracket comprising a base end configured to attach to the base portion, the base end comprising a ring shape, the base support bracket further comprising a vessel end configured to attach to an inner periphery of the vessel.

11. The system of claim 1, in which the base portion comprises a centering pin configured to at least partially pass through the base portion for stabilizing the axis of rotation for the base portion.

12. The system of claim 1, in which the base portion comprises a base exterior portion, the base exterior portion comprising at least one protruding member configured to at least partially agitate and guide the circulating growth fluid, the at least one protruding member comprising at least one fin.

13. The system of claim 1, in which the base portion comprises a base interior portion, the base interior portion comprising a spring assembly configured to help minimize space between the base end and the base portion.

14. The system of claim 1, in which the base interior portion comprises a gear system configured to actuate rotation of the base portion, the base interior portion further comprising at least one buoyant member configured to enable the base portion to maintain buoyancy in the growth fluid, the at least one buoyant member comprising a buoyant member valve configured to regulate the buoyancy of the at least one buoyant member, the base interior portion further comprising an air distribution manifold configured to regulate flow of the external fluid to the gear system and the at least one buoyant member.

15. The system of claim 1, in which the base portion is configured to maintain buoyancy in the growth fluid, the buoyancy adjustable in conjunction to a weight of the at least one plant.

16. The system of claim 1 further comprising a fluid line, wherein the fluid line is configured to carry the external fluid to the aquaponic vessel, the fluid line comprising a fluid line bracket configured to secure the fluid line to the aquaponic vessel, the fluid line further comprising a fluid line swivel configured to enable at least partial adjustment of the fluid line in relation to the aquaponic vessel, the fluid line swivel further configured to facilitate rotation of the base portion.

17. The system of claim 1 further comprising a central mast, wherein the central mast is configured to align along the axis of rotation, the central mast further being disposed to extend between the fluid line swivel and the base end of the support bracket.

18. The system of claim 1, in which the external fluid is disposed to flow from the aquaponic vessel to the base interior portion through a base inlet.

19. An electrical rotatable vertical growing system for generating rotational flow, movement and pressure in a growth fluid, the electrical rotatable vertical growing system comprising:
- an aquaponic vessel configured to contain a growth fluid and at least one aquatic animal;
- at least one hydroponic growing container configured to contain at least one plant,
- wherein the growth fluid is configured to circulate between the aquaponic vessel and the at least one hydroponic growing container;
- a base portion comprising a base support bracket disposed to position said base portion in a generally concentric area of the aquaponic vessel such that the base portion is rotatable about a vertical axis of rotation with respect to the aquaponic vessel and configured to rotatably engage the growth fluid, the rotation of the base portion configured to produce/generate rotational flow/movement of the growth fluid, such that the rotational flow/movement of the growth fluid by the base portion is configured to at least partially increase a flow rate of the growth fluid, and further configured to at least partially aerate the growth fluid,
- the base portion further configured to join with the at least one hydroponic growing container, the rotation of the base portion further configured to selectively expose the at least one plant to light;
- an external fluid configured to discharge into the aquaponic vessel, the discharge configured to generate a pressure in the growth fluid, the pressure configured to at least partially increase the flow rate of the growth fluid, the pressure further configured to at least partially aerate the growth fluid, the pressure further configured to at least partially actuate rotation of the base portion;
- a photovoltaic cell configured to generate power for at least partially rotating the base portion;
- an electrical portion configured to regulate distribution of the power; and
- a wire circuitry configured to carry the power.

* * * * *